(12) United States Patent
Motoyama et al.

(10) Patent No.: US 9,775,302 B2
(45) Date of Patent: Oct. 3, 2017

(54) AIR CONDITIONING APPARATUS IN PLANT CULTIVATION

(71) Applicant: PANASONIC INTELLECTUAL PROPERTY MANAGEMENT CO., LTD., Osaka (JP)

(72) Inventors: Keita Motoyama, Osaka (JP); Hiroyuki Naka, Osaka (JP); Yuko Fukui, Fukushima (JP); Keiji Murao, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 14/379,167

(22) PCT Filed: Dec. 11, 2013

(86) PCT No.: PCT/JP2013/007278
§ 371 (c)(1),
(2) Date: Aug. 15, 2014

(87) PCT Pub. No.: WO2014/136163
PCT Pub. Date: Sep. 12, 2014

(65) Prior Publication Data
US 2016/0235018 A1 Aug. 18, 2016

(30) Foreign Application Priority Data
Mar. 8, 2013 (JP) .................................. 2013-046357

(51) Int. Cl.
A01G 31/00 (2006.01)
A01G 9/24 (2006.01)
(Continued)

(52) U.S. Cl.
CPC ............... *A01G 9/246* (2013.01); *A01G 7/02* (2013.01); *A01G 9/18* (2013.01); *A01G 31/02* (2013.01)

(58) Field of Classification Search
CPC . A01G 9/246; A01G 7/02; A01G 9/18; A01G 9/24
See application file for complete search history.

(56) References Cited

U.S. PATENT DOCUMENTS

| 2006/0162246 A1 | 7/2006 | Okabe et al. |
| 2013/0000185 A1 | 1/2013 | Tanase et al. |
| 2013/0111811 A1 | 5/2013 | Miyauchi et al. |

FOREIGN PATENT DOCUMENTS

| CN | 1668186 | 9/2005 |
| CN | 202425377 | 9/2012 |

(Continued)

OTHER PUBLICATIONS

Office Action and Search Report dated Aug. 28, 2015 in Chinese Application No. 201380008265.X, with English translation.
(Continued)

Primary Examiner — Kristen C Hayes
(74) Attorney, Agent, or Firm — Wenderoth, Lind & Ponack, L.L.P.

(57) ABSTRACT

In an air conditioning apparatus, mixed ambient gas obtained by mixing carbon dioxide with ambient gas in a mixing unit communicating with outlets is supplied to a plant substantially uniformly through the outlets installed in the vicinity of the plant, which makes transpiration of leaves of the plant uniform, and further allows air conditioning control to be performed only over the vicinity of the plant and carbon gas concentration to be managed on the vicinity of the plant.

3 Claims, 7 Drawing Sheets

(51) Int. Cl.
  *A01G 7/02*  (2006.01)
  *A01G 9/18*  (2006.01)
  *A01G 31/02* (2006.01)

(56) References Cited

FOREIGN PATENT DOCUMENTS

| | | |
|---|---|---|
| CN | 102811606 | 12/2012 |
| CN | 102905514 | 1/2013 |
| JP | 52-21128 | 2/1977 |
| JP | 2003-52253 | 2/2003 |
| JP | 2007-236235 | 9/2007 |
| JP | 2010-273601 | 12/2010 |
| WO | 2009/076505 | 6/2009 |
| WO | 2011/162220 | 12/2011 |

OTHER PUBLICATIONS

International Preliminary Report on Patentability issued Sep. 17, 2015 in International (PCT) Application No. PCT/JP2013/007278, with English translation.

International Search Report issued Mar. 18, 2014 in International (PCT) Application No. PCT/JP2013/007278.

Kazutoshi Yabuki et al., "Studies on the Effect of Wind Speed Upon the Photosynthesis (2) Agricultural Meteorology", vol. 26, No. 3, pp. 137-141, Dec. 1970 along with English translation of Summary.

ized by the air fans 25 installed in the back surface of
AIR CONDITIONING APPARATUS IN PLANT CULTIVATION

TECHNICAL FIELD

The present invention relates to an air conditioning apparatus in plant cultivation that realizes air conditioning control only over a vicinity of a plant and growth promotion of the plant at the same time in a plant factory.

BACKGROUND ART

As to a conventional air conditioning method in a plant factory, there is an air conditioning method of, for example, Japanese Unexamined Patent Publication No. 2003-52253 as a method of performing air conditioning control over a whole cultivation room by an air conditioner provided on a wall surface, or a method of installing circulation fans in a multistage cultivation shelf to perform air conditioning control over the respective stages in constant flows.

FIG. 6 is a view showing an air conditioning method of Japanese Unexamined Patent Publication No. 2003-52253. An arrow shows a direction of air-flows. Plants are planted and cultivated in cell trays 27 installed in box-shaped raising seedling apparatuses 22. In this air conditioning method, air subjected to cooling and humidity conditioning by an indoor unit 21 of an air conditioning apparatus provided on a wall surface of an enclosed structure 20 is sucked from a front surface side of the box-shaped raising seedling apparatuses 22 by activation of air fans 25 installed in a back surface of a raising seedling shelf 26 to be exhausted to a space between the wall surface of the enclosed structure 20 and the back surfaces of the box-shaped raising seedling apparatuses 22 via air rooms 24. The air exhausted to this space has been heated by heat generated by artificial lighting apparatuses 28, temperature and humidity thereof are readjusted by the indoor unit 21 of the air conditioning apparatus, and the air is repeatedly resupplied to an open front surface side of raising seedling spaces 23 of the box-shaped raising seedling apparatuses 22.

Moreover, generally, the air whose temperature, humidity, and carbon dioxide concentration have been adjusted are supplied to leaves and stems at a proper wind velocity during plant raising, by which transpiration of the leaves in the plants is promoted, and photosynthesis is also promoted.

FIG. 7 is a view showing a correlation between a wind velocity and a transpiration rate described in Studies on the Effect of Wind Speed upon the Photosynthesis (2), The Relation between Wind Speed and Photosynthesis by Kazutoshi YABUKI and Hideo MIYAGAWA, Agricultural Meteorology Vol. 26, No. 3, p. 139, December 1970 thereinafter referred to as "YABUKI et al."). In an environment of an ambient temperature of 25 degrees, the transpiration rate one hour later in an area 10 cm×10 cm of a central portion of a leaf of a plant is shown, when the wind velocity is changed in the vicinity of the leaf of the plant under three conditions of relative humidities of 50%, 65% and 80%.

Referring to FIG. 7, a minimum wind velocity effective to the transpiration of the leaf of the plant is 0.05 m/sec. Moreover, while an optimum wind velocity differs depending on the humidity condition, the transpiration rate is increased by raising the wind velocity in the vicinity of the plant.

TECHNICAL PROBLEM

In the conventional air conditioning method, as shown in FIG. 6, since the structure is such that the air is sucked from the open front surface side of the raising seedling spaces 23 of the box-shaped raising seedling apparatuses 22 and is exhausted by the air fans 25 installed in the back surface of the raising seedling shelf 26, an air current is constantly unidirectional. Moreover, as the plants planted in the cell trays 27 are growing, the plants become obstructions of the air current. With the individual plant or in view of the whole raising seedling space 23, a wind velocity difference occurs between a windward side and a leeward side, thereby causing a surface against which the wind effective to the transpiration sufficiently blows and a surface against which the relevant wind does not sufficiently blow. Thus, there is a problem that an adverse effect such as variation in transpiration rate is caused.

SUMMARY OF INVENTION

Accordingly, an object of the present invention is to solve the above-described problem, and to provide an conditioning apparatus in plant cultivation that performs air conditioning control and carbon dioxide concentration management only over a space necessary for the plant cultivation to thereby reduce an air conditioning load, and that further uniformly supplies wind and carbon dioxide to a whole plant to thereby suppress variation in transpiration.

Solution to Problem

In order to solve the above-described problem, the present invention is constituted as follows.

According to an aspect of the present invention, there is an air conditioning apparatus in plant cultivation that supplies air whose temperature, humidity, and carbon dioxide concentration are adjusted only to a vicinity of a plant, the air conditioning apparatus comprising:

a carbon dioxide generating unit that generates carbon dioxide whose concentration is adjusted;

an air supply unit that supplies ambient gas or outer air whose temperature and humidity are adjusted;

a mixing unit coupled to the carbon dioxide generating unit through a first duct, coupled to the air supply unit through a second duct, and configured to mix the carbon dioxide generated from the carbon dioxide generating unit and the ambient gas or the outer air supplied from the air supply unit, to form a mixed ambient gas; and connection pipes coupled to the mixing unit, and having a plurality of outlets that supply the mixed ambient gas to the vicinity of the plant, wherein at least the three or more outlets are included for one hole for plant planting of a plant cultivation apparatus, and the outlets are installed so that angles formed by centers of the adjacent outlets and a center of the hole for plant planting are equiangular or less than substantially 180 degrees.

Advantageous Effects of Invention

According to the air conditioning apparatus that performs an air conditioning control only over the vicinity of the plant, and supplies carbon dioxide only to the same in the above-described aspect of the present invention, an air conditioning load and an input of carbon dioxide can be largely reduced, and uniformizing a transpiration rate can suppress variation in growth.

BRIEF DESCRIPTION OF DRAWINGS

These and other aspects and features of the present invention will become clear from the following description taken in conjunction with the preferred embodiments thereof with reference to the accompanying drawings, in which.

DESCRIPTION OF EMBODIMENTS

First Embodiment

Hereinafter, an air conditioning apparatus in plant cultivation according to a first embodiment of the present invention will be described with reference to the drawings.

Figure 1:
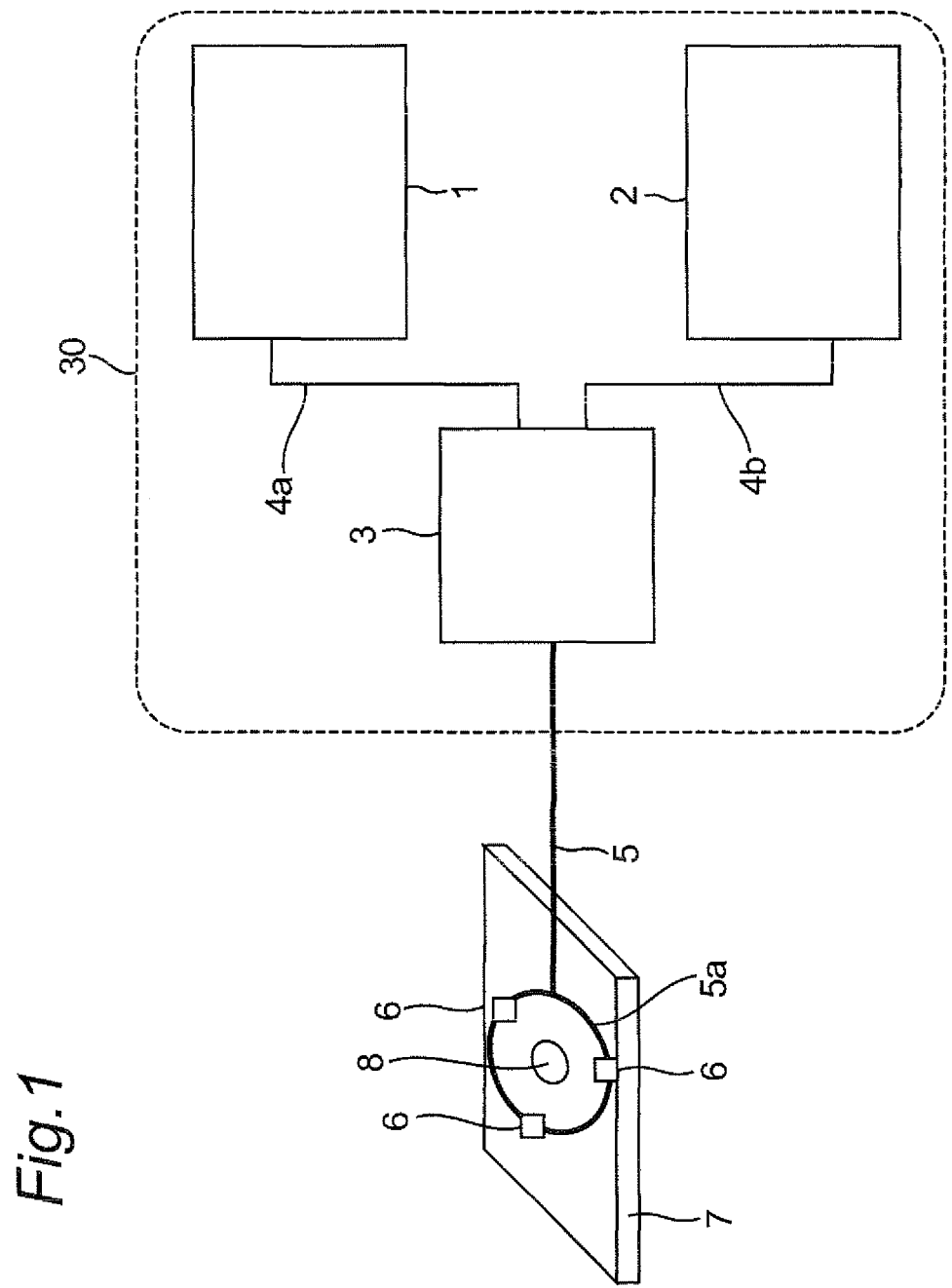
FIG. 1 is an explanatory view of an air conditioning apparatus carrying out an air conditioning method of a first embodiment of the present invention.

FIG. 1 is an explanatory view of the air conditioning apparatus when the air conditioning apparatus in the plant cultivation is applied to a hydroponic apparatus, the air conditioning apparatus carrying out an air conditioning method in the plant cultivation in the first embodiment of the present invention. In FIG. 1, others than configurations regarding the air conditioning apparatus carrying out the air conditioning method of the first embodiment of the present invention, such as those of a cultivation bed, a raising seedling shelf, and the like, are omitted. A cultivation panel 7 constituting a part of a plant cultivation apparatus such as the cultivation bed, the raising seedling shelf, and the like is provided with a circular hole for plant planting 8 in a center thereof to arrange a plant in the circular hole for plant planting 8.

The air conditioning apparatus carrying out the air conditioning method in the foregoing aspect of the present invention is constituted by a blower 30, connection pipes 5, and outlets 6. The blower 30 includes an air supply unit 1, a carbon dioxide generating unit 2, and a mixing unit 3. The air supply unit 1 and the carbon dioxide generating unit 2 are coupled to the mixing unit 3 through first and second ducts 4a, 4b, respectively.

The air supply unit 1 has a function of adjusting temperature and humidity, and supplies, to the mixing unit 3 through the first duct 4a, the air (ambient gas or outer air) whose temperature and humidity have been adjusted.

The carbon dioxide generating unit 2 generates carbon dioxide and adjusts concentration of the carbon dioxide to supply the carbon dioxide, which has been generated and whose concentration has been adjusted, to the mixing unit 3 through the second duct 4b.

In the mixing unit 3, the carbon dioxide generated from the carbon dioxide generating unit 2 and the air whose temperature and humidity have been adjusted by the air supply unit 1 are mixed.

The outlets 6 of the air are installed in the vicinity of the plant of the cultivation panel 7.

As to the connection pipes 5, one end thereof communicates with the plurality of outlets 6, and the other end thereof is coupled to the mixing unit 3 of the blower 30. Thus, mixed ambient gas, which has been mixed in the mixing unit 3, in other words, the air is guided to the outlets 6 installed in the cultivation panel 7 through the connection pipes 5, and is supplied to the plant through the outlets 6 upward from below. For example, in FIG. 1, in a circular pipe portion 5a installed in the cultivation panel 7, the three outlets 6 are arranged at regular intervals around the plant in the cultivation panel 7. An opening height of each of the outlets 6 may be, for example, a height up to a first divided portion $DV_1$ of a plant model 9 described later.

Alternatively, with the connection pipes 5, the respective outlets 6 and the mixing unit 3 of the blower 30 may be coupled one by one.

In the case where the air conditioning method of the first embodiment of the present invention is applied to soil cultivation or other cultivation methods, the cultivation panel 7 or the circular hole for plant planting 8 provided at the center of the cultivation panel 7 so as to penetrate the cultivation panel 7 may be replaced in accordance with the applied cultivation method as needed. For example, in the soil cultivation, the cultivation panel 7 is unnecessary, and the hole for plant planting 8 may be replaced by a position where the plant is planted.

Figure 2:
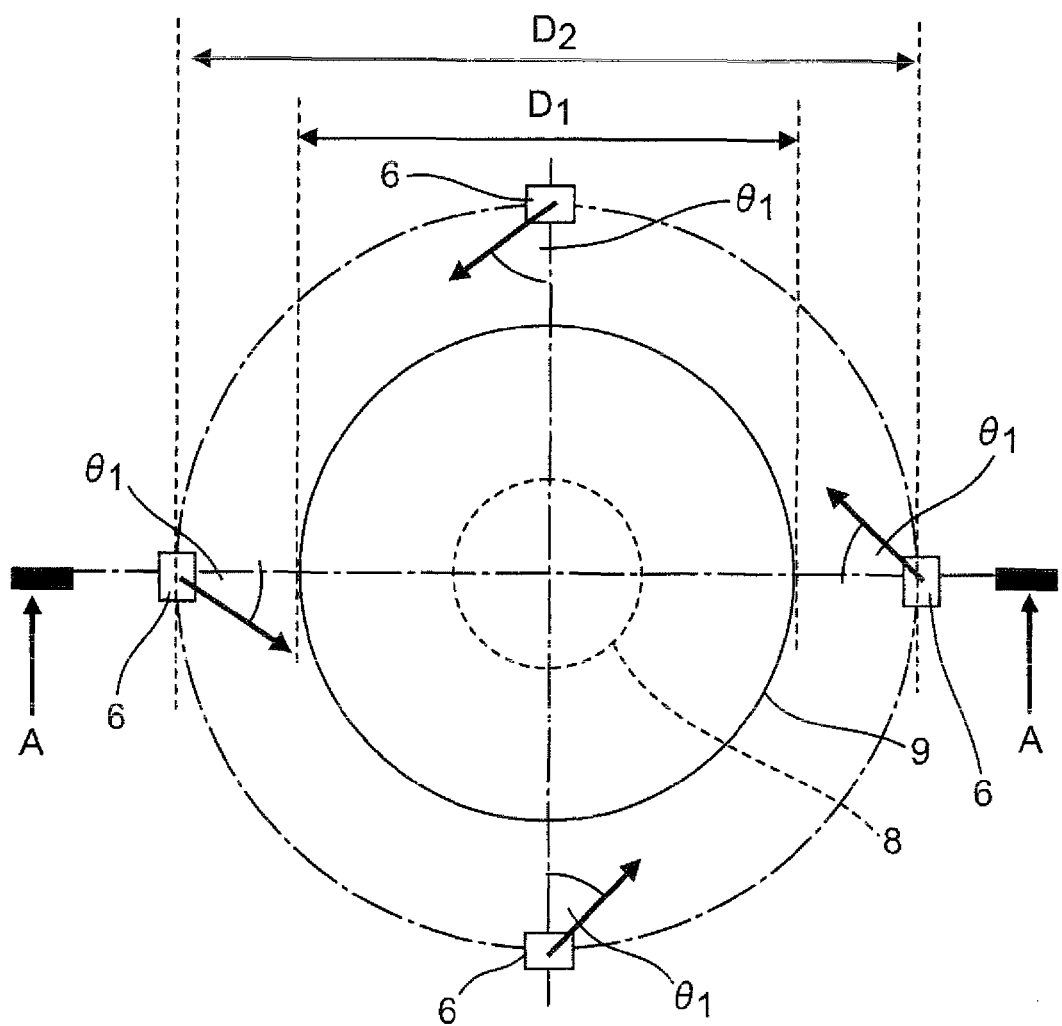
FIG. 2 is a top view of a basic analysis model in the air conditioning method of the first embodiment of the present invention.
Figure 3:
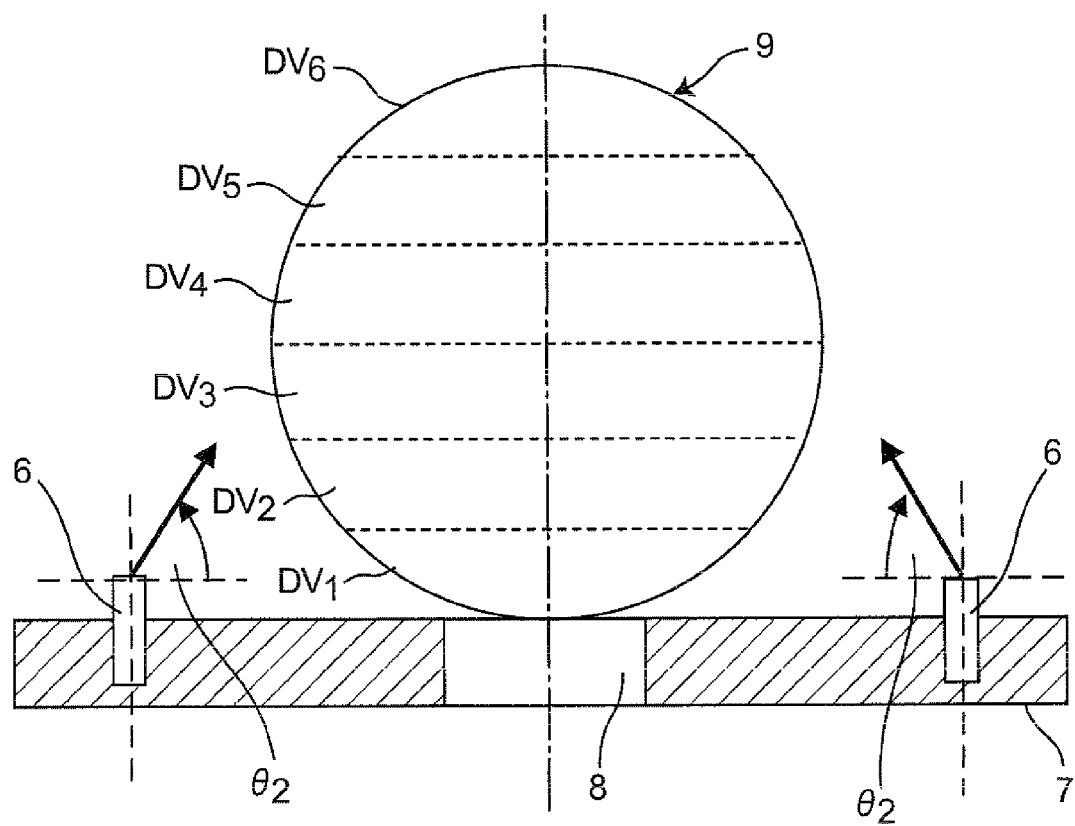
FIG. 3 is a partial cross-sectional view along A-A in FIG. 2 of the basic analysis model in the air conditioning method of the first embodiment of the present invention.

FIGS. 2 and 3 are views each showing a basic analysis model for finding an optimum installation condition of the air conditioning apparatus carrying out the air conditioning method in the first embodiment of the present invention. FIG. 2 is a top view of the basic analysis model. FIG. 3 is a partial cross-sectional view along A-A in FIG. 2 of the basic analysis model. In the basic analysis model, the blower 30 and the connection pipes 5 are omitted.

Referring to FIG. 2, the plant is modeled on the assumption that the plant has a spherical form having a diameter $D_1$=100 mm. This plant model 9 is planted in the circular hole for plant planting 8 provided in the center of the cultivation panel 7, and is arranged so that a center of a sphere of the plant model 9 and a center of the circular hole for plant planting 8 are identical.

The four outlets 6 are installed at intervals of a substantially equal angle on a circumference of a diameter $D_2$=150 mm of a pipe central circle of the pipe portion 5a, which is a concentric circle with the circular hole for plant planting 8 processed in the cultivation panel 7, and a wind velocity of the air supplied through the outlets 6 is set to 0.5 m/sec immediately after the outlets 6.

A direction of the air supplied to the plant model 9 through each of the outlets 6 is decided by combination of a horizontal angle $\theta_1$ and a vertical angle $\theta_2$.

Here, as to the horizontal angle $\theta_1$, an angle when the outlet 6 is directed toward the center of the hole for plant planting 8 is 0 degrees with a line connecting the center of the hole for plant planting 8 and the center of the outlet 6 used as a reference, and a clockwise direction at the time of rotation around the outlet 6 is defined as positive. Moreover, as for the vertical angle $\theta_2$, an angle when the outlet 6 is directed toward the hole for plant planting 8 in a horizontal direction is 0 degrees with a top surface of the outlet 6 used as a reference, and a vertical upward angle is defined as positive.

Moreover, in order to find an optimum installation condition necessary for the air conditioning apparatus carrying out the air conditioning method of the first embodiment of the present invention, analysis is respectively conducted, with the basic analysis model as a reference, utilizing general-purpose thermofluid analysis software "STREAM" (product name, Registered Trademark) manufactured by Software Cradle Co., Ltd. for the horizontal angle $\theta_1$, the vertical angle $\theta_2$ arrangement of the outlets 6, and the number of the outlets 6 by changing the conditions as follows.

(1) Conditions obtained by combining five conditions that the horizontal angle $\theta_1$ is set to 0 degrees, 15 degrees, 25 degrees, 35 degrees, and 45 degrees, and six conditions that the vertical angle $\theta_2$ is set to 15 degrees, 30 degrees, 45 degrees, 60 degrees, 75 degrees, and 80 degrees.

(2) Six conditions that the three, four, six, eight, twelve, and sixteen outlets 6 are installed at intervals of an equal angle on the concentric circle with the center of the circular hole for plant planting 8.

(3) Five conditions that the pipe central circle of the pipe portion 5a where the outlets 6 are arranged is a concentric circle with the hole for plant planting 8, and the diameter $D_2$ of the relevant pipe central circle is set to 50 mm, 100 mm, 150 mm, 200 mm, and 250 mm.

Figure 7:
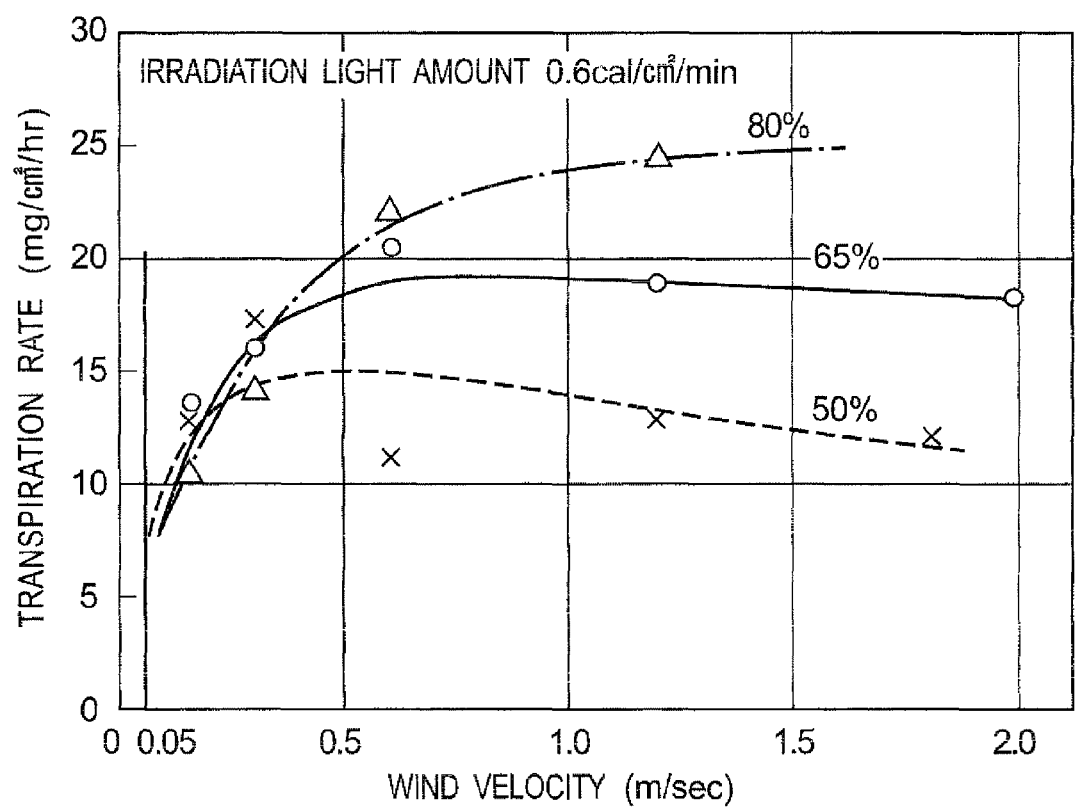
FIG. 7 is a view showing a relation between a wind velocity and a transpiration rate described in YABUKI et al.

As a determination reference of the presence or absence of an effect in the first embodiment of the present invention, as shown in FIG. 3, the spherical plant model 9 is virtually divided into six portions substantially evenly in a horizontal direction, and the portions are defined as a first divided portion $DV_1$ to a sixth divided portion $DV_6$ from the bottom, respectively. An average wind velocity on a surface in each of the divided portions $DV_1$ to $DV_6$ of the divided plant model 9 is evaluated. Here, attention is paid to the divided portion $DV_3$ on a third step from the bottom and the fourth divided portion $DV_4$ on a fourth step from the bottom. From the drawing of the correlation between the wind velocity and the transpiration rate described in YABUKI et al. of FIG. 7, a condition is found in which the average wind velocities on the respective surfaces of the third divided portion $DV_3$ and the fourth divided portion $DV_4$ become the wind velocity of 0.05 m/sec, which has a minimum effect on the transpiration of the plant, or higher. A case where both of the average wind velocities on the surfaces of the third divided portion $DV_3$ and the fourth divided portion $DV_4$ exceed 0.05 m/sec is defined as "○", a case where any one of the average wind velocities on the surfaces of the third divided portion $DV_3$ and the fourth divided portion $DV_4$ exceeds 0.05 m/sec is defined as "Δ", and a case where both of the average wind velocities on the surfaces of the third divided portion $DV_3$ and the fourth divided portion $DV_4$ are lower than 0.05 m/sec is defined as "x", and results thereof will be described.

TABLE 1

| | | Vertical angle $\theta_2$ | | | | | |
|---|---|---|---|---|---|---|---|
| | | 15 degrees | 30 degrees | 45 degrees | 60 degrees | 75 degrees | 80 degrees |
| Horizontal angle $\theta_1$ | 0 degrees | X | ○ | ○ | ○ | ○ | Δ |
| | 15 degrees | Δ | ○ | ○ | ○ | ○ | Δ |
| | 25 degrees | Δ | ○ | ○ | ○ | ○ | Δ |
| | 35 degrees | Δ | Δ | ○ | ○ | ○ | X |
| | 45 degrees | X | X | ○ | ○ | Δ | X |

Table 1 is a table in which analysis results are compiled, based on the determination reference in the combination of the horizontal angle $\theta_1$ and the vertical angle $\theta_2$.

Referring to table 1, as to angular ranges of the horizontal angle $\theta_1$ and the vertical angle $\theta_2$, when the horizontal angle $\theta_1$ is 0 degrees or more and 25 degrees or less, the vertical angle $\theta_2$ becomes 30 degrees or more and 75 degrees or less. Moreover, when the horizontal angle $\theta_1$ is above 25 degrees and 35 degrees or less, the vertical angle $\theta_2$ becomes 45 degrees or more and 75 degrees or less. When the horizontal angle $\theta_1$ is above 35 degrees and 45 degrees or less, the vertical angle $\theta_2$ becomes 45 degrees or more and 60 degrees or less. The above-described setting of the angular ranges of the horizontal angle $\theta_1$ and the vertical angle $\theta_2$ can assure the wind velocity 0.05 m/sec, which has the minimum effect on the transpiration of the plant, or higher.

Furthermore, since in view of achievement of a desired effect described later, blowing directions of the air supplied from all the outlets 6 need to be unidirectional, it is desirable that a code of the horizontal angle $\theta_1$ is identical in the respective outlets 6, and the horizontal angles $\theta_1$ and the vertical angles $\theta_2$ are identical in the desirable angular ranges in the respective installed outlets 6. This is because if the codes of the horizontal angles of the adjacent outlets 6 are different from each other the air supplied from the adjacent outlets collides, thereby disabling the air to be uniformly supplied to the plant.

The horizontal angle $\theta_1$ and the vertical angle $\theta_2$ may be arbitrary angles within the angular ranges in each of the outlets 6, and the horizontal angle $\theta_1$ may be an angle in a negative direction.

TABLE 2

| | Diameter $D_2$ (unit: mm) | | | | |
|---|---|---|---|---|---|
| | 50 | 100 | 150 | 200 | 250 |
| Evaluation result | Δ | ○ | ○ | ○ | ○ |

Table 2 is a table in which the analysis results are compiled, based on the determination reference with reference to the diameter $D_2$ of the concentric circle.

Referring to table 2, it is desirable that the outlets 6 are installed in a range where the diameter $D_2$ of the concentric circle is 100 mm or more and 250 or less, and if a ratio between the range of the diameter $D_2$ of the concentric circle and the diameter D1 of the plant is expressed as $D_2/D_1$, a range of $D_2/D_1$ becomes 1.0 or more and 2.5 or less.

TABLE 3

| | | Evaluation result |
|---|---|---|
| Number of outlets | 2 | X |
| | 3 | ○ |
| | 4 | ○ |
| | 6 | ○ |
| | 8 | ○ |
| | 12 | ○ |
| | 16 | ○ |

Moreover, table 3 is a table in which the number of the outlets 6 is compiled based on the determination reference.

Referring to table 3, as to the number of the outlets 6, in the results of all the cases, the wind velocity becomes 0.05 m/sec, which has the minimum effect on the transpiration, or higher, and influence by increasing the number of the outlets 6 is small.

However, when the number of the outlets 6 is two or less, the air cannot be uniformly supplied.

From the foregoing, it is desirable that all the outlets 6 are installed on the one concentric circle centering on the circular hole for plant planting 8, and the ratio $D_2/D_1$ between the diameter $D_2$ of the concentric circle and the diameter $D_1$ of the plant is in the range of 1.0 or more and 2.5 or less, and the angle formed by the centers of the adjacent two outlets 6 and the center of the hole for plant planting 8 is less than substantially 180 degrees, and equi-angularity is more desirable.

Moreover, with the diameter $D_2$ of the installed outlets 6, the respective outlets 6 may be arranged on a plurality of concentric circles within the above-described range of $D_2/D_1$.

According to the air conditioning apparatus that performs the air conditioning control only over the vicinity of the plant and supplies carbon dioxide only to the same in the first embodiment of the present invention, the plant cultivation apparatus 7 includes at least the three or more outlets 6 for one hole for plant planting 8, and the outlets 6 are installed so that the angle formed by the centers of the adjacent outlets 6 and the center of the hole for plant planting 8 is equiangular or less than substantially 180 degrees. This configuration can largely reduce an air conditioning load and an input of the carbon dioxide, and uniformizing a transpiration rate can suppress variation in growth.

Moreover, in the first embodiment, if the horizontal angle is $\theta_1$ and the vertical angle is $\theta_2$ in the angle of the blowing of the mixed ambient gas supplied from the respective outlets 6, the outlets 6 are installed so that when the horizontal angle $\theta_1$ is 0 degrees or more and 25 degrees or less, the vertical angle $\theta_2$ becomes 30 degrees or more and 75 degrees or less, when the horizontal angle $\theta_1$ is above 25 degrees and 35 degrees or less, the vertical angle $\theta_2$ becomes 45 degrees or more and 75 degrees or less, and when the horizontal angle $\theta_1$ is above 35 degrees and 45 degrees or less, the vertical angle $\theta_2$ becomes 45 degrees or more and 60 degrees or less. In addition, the plurality of outlets 6 are arranged on the concentric circle with the circular shape of the hole for plant planting 8, and are installed so that the diameter $D_2$ of the concentric circle is 1.0 time or more and 2.5 times or less as large as the diameter $D_1$ of the plant. This configuration can produce an effect of increasing the transpiration rate and promoting the growth of the plant.

Figure 4:
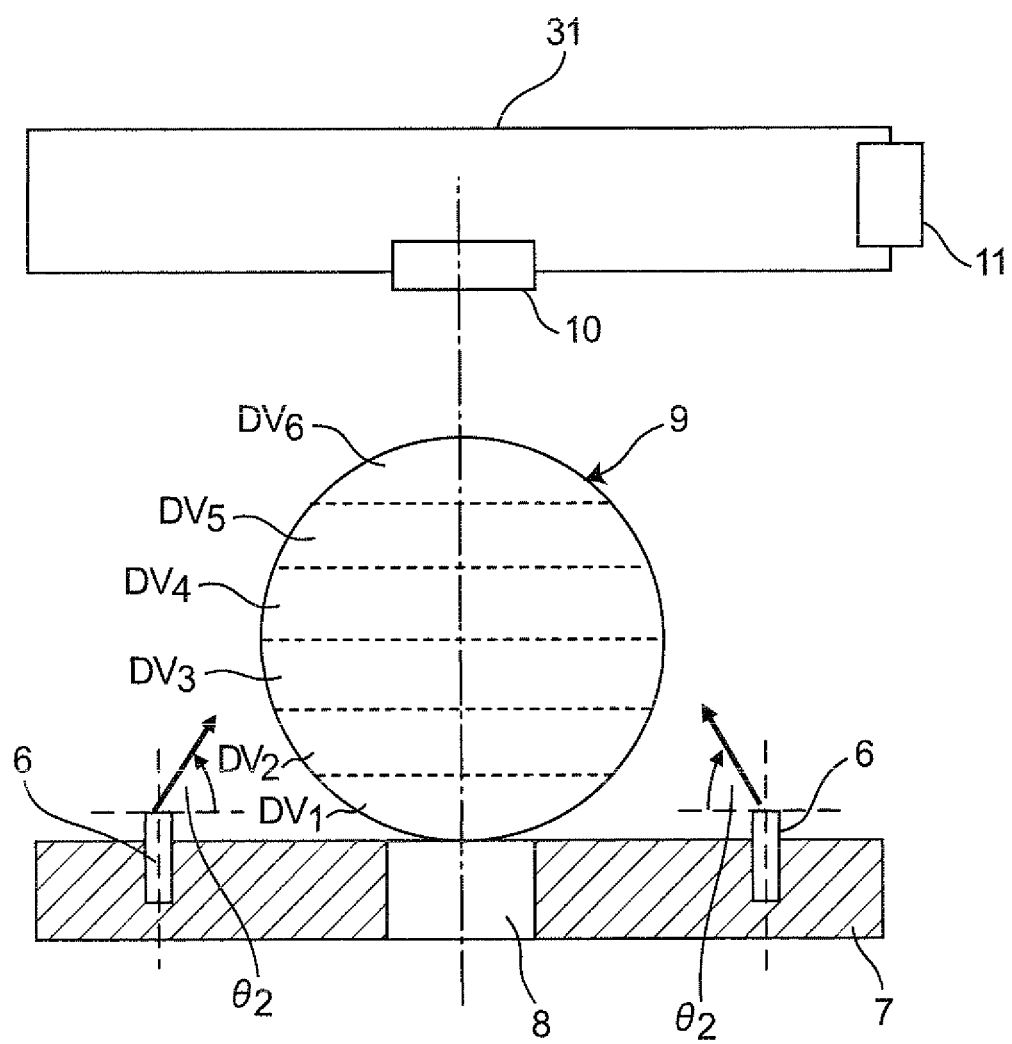
FIG. 4 is a configuration view when an exhaust unit is additionally installed above a plant in a first modification of the first embodiment of the present invention.

Next, FIG. 4 is a view showing a method for supplying the air more uniformly to the fourth to sixth divided portions $DV_4$ to $DV_6$ on fourth to sixth steps from the bottom of the divided portions in the plant model 9 in a first modification of the first embodiment of the present invention.

FIG. 4 shows an air conditioning apparatus carrying out an air conditioning method characterized in that an exhaust unit 31 is additionally installed at a position corresponding to an inner side of the plant model 9 above the plant model 9.

The exhaust unit 31 includes a circular exhaust port 10 arranged substantially concentrically with the center of the circular hole for plant planting 8, and an exhaust fan 11 communicating with the exhaust port 10.

The air supplied from a lower side to an upper side of the plant by the respective outlets 6 is sucked by the exhaust fan 11 through the exhaust port 10. This allows the air currents from the respective outlets 6 to converge on the exhaust port 10, which enables the more air to be supplied to the fifth divided portion $DV_5$ on the fifth step and the sixth divided portion $DV_6$ on the sixth step from the bottom of the plant model 9, so that the air can be supplied to the whole plant more uniformly.

Figure 5:
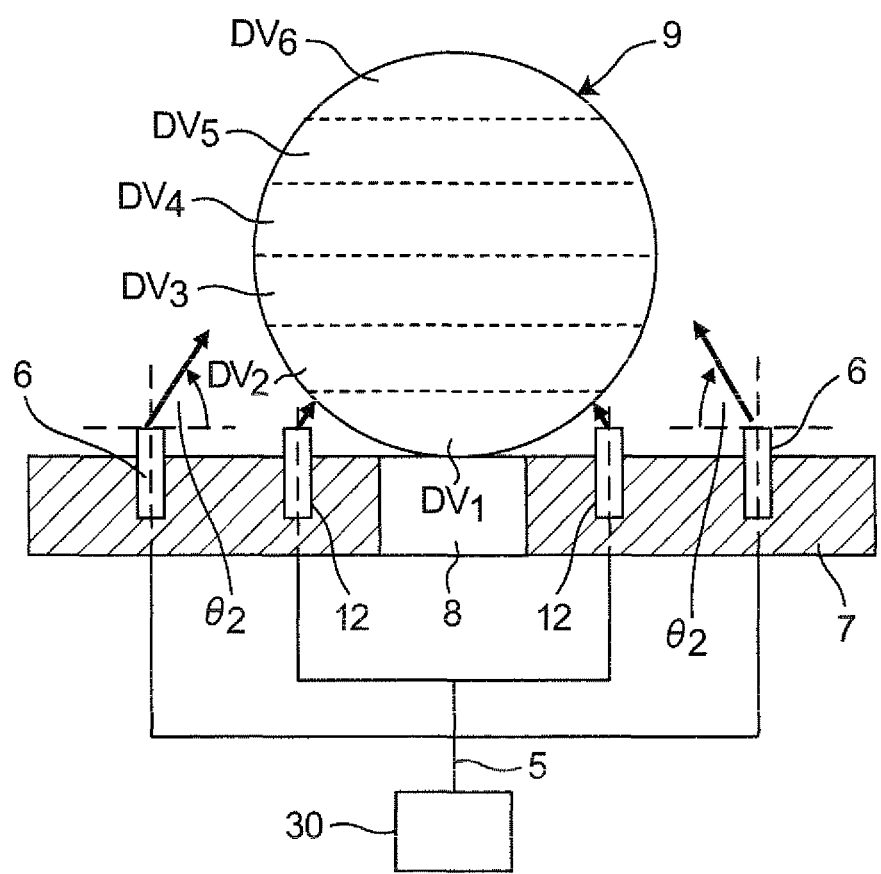
FIG. 5 is a configuration view when auxiliary outlets are installed in the first modification of the first embodiment of the present invention.
Figure 6:
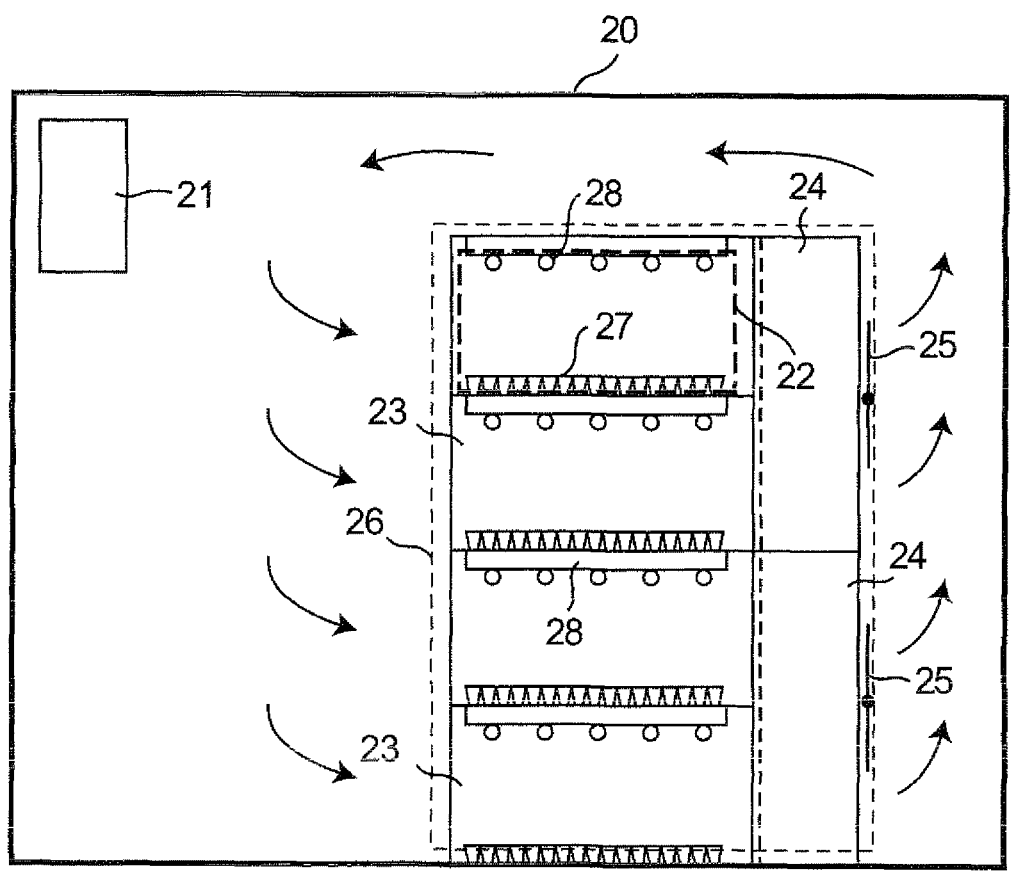
FIG. 6 is a view showing a conventional air conditioning method described in Japanese Unexamined Patent Publication No. 2003-52253.

Next, FIG. 5 is a view showing a method of supplying the more air to the first divided portion $DV_1$ on the first step to the second divided portion $DV_3$ on the third step from the bottom of the divided portions of the plant model 9 in a second modification of the first embodiment of the present invention.

FIG. 5 shows an air conditioning apparatus carrying out an air conditioning method characterized in that within a range of a circle larger than a circumference of the circular hole of plant planting 8, a plurality of auxiliary outlets 12 are additionally installed so that the ratio $D_2/D_1$ between the diameter $D_1$ of the plant model 9 and the diameter $D_2$ of the arrangement of the outlets 6 is less than 1.0.

The auxiliary outlets 12 are coupled to the blower 30 through the connection pipes 5 similarly to the outlets 6.

TABLE 4

|  |  | Diameter of outlet arrangement 50 mm |
|---|---|---|
| Divided portion | $DV_6$ | X |
|  | $DV_5$ | X |
|  | $DV_4$ | X |
|  | $DV_3$ | ◯ |
|  | $DV_2$ | ⊙ |
|  | $DV_1$ | ⊙ |

Table 4 is a table in which in the analysis results, as to the average wind velocities of the respective divided portions $DV_1$ to $DV_6$ when the diameter $D_1$ is 50 mm, 0.1 m/sec or higher is "⊙" (double circle), 0.05 m/sec or higher and lower than 0.1 m/sec is "◯" (circle), and lower than 0.05 m/sec is "x".

Referring to table 4, it is found that when $D_2/D_1$ is less than 1.0, the more air can be supplied to the first divided portion $DV_1$ on the first step to the third divided portion $DV_3$ on the third step from the bottom in the divided portions of the plant model 9. Thus, the combination of the auxiliary outlets 12 and the outlets 6 enables the more air to be supplied to the first divided portion $DV_1$ on the first step to the first divided portion $DV_3$ on the third step from the bottom with respect to the plant model 9, thereby allowing the air to be supplied to the whole plant more uniformly.

As to each of the auxiliary outlets 12, the diameter $D_2$ of a concentric circle thereof is larger than that of the hole for plant planting 8, and the auxiliary outlets 12 are arranged within the range of less than 1.0 time as large as the diameter $D_1$ of the plant, and are coupled to the mixing unit 3 through the connection pipes 5 to auxiliarily supply the mixed ambient gas to the plant. As to arrangement positions of the auxiliary outlets 12, at least the three or more auxiliary outlets 12 may be arranged within the range. The auxiliary outlets 12 and the outlets 6 need not be arranged at the same phase in the concentric circles. An opening height of the auxiliary outlets 12 may be, for example, a height up to the first divided portion $DV_1$ of the plant.

The exhaust unit 31 and the auxiliary outlets 12 may be additionally installed at the same time.

The above-described various embodiments or modifications may be arbitrarily combined as needed, which can exerts an effect that each of the combinations has.

INDUSTRIAL APPLICABILITY

According to the air conditioning apparatus in the plant cultivation according to the above-described aspect of the present invention, an air conditioning load and an input of the carbon dioxide can be largely reduced, and uniformizing the transpiration rate can suppress the variation in growth. Thus, the air conditioning apparatus in the plant cultivation according to the above-described aspect of the present invention can be applied to, for example, the hydroponic method, the soil cultivation method, or other cultivation methods, and similar effects can be obtained.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An air conditioning apparatus, comprising:
a carbon dioxide generating unit that generates carbon dioxide;
an air supply unit that supplies ambient gas or outer air;
a mixing unit coupled to the carbon dioxide generating unit through a first duct, coupled to the air supply unit through a second duct, and configured to mix the carbon dioxide generated from the carbon dioxide generating unit and the ambient gas or the outer air supplied from the air supply unit, to form a mixed ambient gas;
a plant cultivation apparatus;
a hole defined in the plant cultivation apparatus; and
connection pipes coupled to the mixing unit, and having outlets that supply the mixed ambient gas above the hole defined in the plant cultivation apparatus,
wherein the connection pipes include a circular pipe portion arranged in a circle that is concentric with the hole defined in the plant cultivation apparatus,
wherein the outlets are arranged on the circular pipe portion,
wherein the circular pipe portion has a diameter D,
wherein 100 mm≤D≤250 mm,
wherein the outlets include at least three outlets and at least three of the outlets are arranged for the hole defined in the plant cultivation apparatus, and the outlets are installed so that angles formed by centers of the adjacent outlets and a center of the hole defined in the plant cultivation apparatus are equiangular or less than substantially 180 degrees, and
wherein:
a horizontal angle $\theta_1$ which is an angle when at least one of the outlets is directed toward the center of the hole defined in the plant cultivation apparatus is 0 degrees with respect to a line connecting the center of the hole defined in the plant cultivation apparatus and the center of the at least one of the outlets, and a clockwise direction at a time of rotation around the at least one of the outlets within a surface parallel to the plant cultivation apparatus is defined as positive, and
a vertical angle $\theta_2$ which is an angle when the at least one of the outlets is directed toward the hole defined in the plant cultivation apparatus in a direction parallel to the plant cultivation apparatus is 0 degrees with respect to a top surface of the at least one of the outlets, and a vertical upward angle is defined as positive, and
each of the outlets is installed such that (i) when the horizontal angle $\theta_1$ is 0 degrees or more and 25 degrees or less, the vertical angle $\theta_2$ is 30 degrees or more and 75 degrees or less, (ii) when the horizontal angle $\theta_1$ is above 25 degrees and 35 degrees or less, the vertical angle $\theta_2$ is 45 degrees or more and 75 degrees or less, and (iii) when the horizontal angle $\theta_1$ is above 35 degrees and 45 degrees or less, the vertical angle $\theta_2$ is 45 degrees or more and 60 degrees or less.

2. The air conditioning apparatus according to claim 1, further comprising an exhaust unit that is arranged above the plant cultivation apparatus and performs exhaust.

3. The air conditioning apparatus according to claim 1, wherein the circular pipe portion is a first circular pipe portion and the air conditioning apparatus further comprises a second circular pipe portion and auxiliary outlets are arranged on the second circular pipe portion, in which a diameter D' of the second circular pipe portion is larger than a diameter of the hole defined in the plant cultivation apparatus, the auxiliary outlets being arranged within a range of less than 100 mm, and being coupled to the mixing unit through at least one of the connection pipes to supply the mixed ambient gas above the hole defined in the plant cultivation apparatus.

* * * * *